United States Patent
Pirak et al.

(10) Patent No.: US 7,848,443 B2
(45) Date of Patent: Dec. 7, 2010

(54) DATA COMMUNICATION WITH EMBEDDED PILOT INFORMATION FOR TIMELY CHANNEL ESTIMATION

(75) Inventors: Chaiyod Pirak, Samsnannok Bangkok (TH); Z. Jane Wang, Vancouver (CA); K. J. Ray Liu, Potomac, MD (US)

(73) Assignee: University of Maryland, College Park, MD (US)

( * ) Notice: Subject to any disclaimer, the term of this patent is extended or adjusted under 35 U.S.C. 154(b) by 873 days.

(21) Appl. No.: 11/471,521

(22) Filed: Jun. 21, 2006

(65) Prior Publication Data

US 2007/0014377 A1  Jan. 18, 2007

Related U.S. Application Data

(60) Provisional application No. 60/692,462, filed on Jun. 21, 2005.

(51) Int. Cl.
*H04B 7/02* (2006.01)
*H04B 7/10* (2006.01)
*H04L 27/00* (2006.01)

(52) U.S. Cl. .................. 375/267; 375/299; 375/347

(58) Field of Classification Search .......... 375/267, 375/299, 347, 260, 259, 295, 346, 316
See application file for complete search history.

(56) References Cited

U.S. PATENT DOCUMENTS

| | | | |
|---|---|---|---|
| 2004/0131011 A1* | 7/2004 | Sandell et al. | 370/210 |
| 2004/0131030 A1* | 7/2004 | Kuroyanagi et al. | 370/335 |
| 2004/0257978 A1 | 12/2004 | Shao et al. | |
| 2005/0213682 A1* | 9/2005 | Han et al. | 375/267 |
| 2005/0249319 A1* | 11/2005 | Suh et al. | 375/347 |
| 2005/0286406 A1* | 12/2005 | Jeon et al. | 370/208 |

OTHER PUBLICATIONS

Tarokh, V, et al.; "Space-Time Codes for High Data Rate Wireless Communication: Performance Criterion and Code Construction"; IEEE Transactions on Information Theory; vol. 44, No. 2, Mar. 1998; pp. 744-765.

Zhu, H.; et al.; "Pilot Embedding for Joint Channel Estimation and Data Detection in MIMO Communication Systems"; IEEE Communications Letters; vol. 7, No. 1, Jan. 2003; pp. 30-32.

Cheon, H., et al.; "Performance Analysis of Space-Time Block Codes in Time-Varying Rayleigh Fading Channels", IEEE International Conference on Acoustics, Speech, and Signal Processing, 2002 Proceedings. (ICASSP '02); vol. 3, 2002; pp. III-2357-III-2360.

Rao, D., et al.; "Low-complexity, Full-diversity Space-Time-Frequency Block Codes for MIMO-OFDM"; in Proceedings GLOBECOM '04; IEEE Global Telecommunications Conference; Dallas,Texas 2004; vol. 1, pp. 204-208.

* cited by examiner

*Primary Examiner*—David C Payne
*Assistant Examiner*—Brian J Stevens
(74) *Attorney, Agent, or Firm*—Rosenberg, Klein & Lee

(57) ABSTRACT

Pilot data and data-bearer data are formed to be mutually orthogonal and in each other's null-space. Data to be transmitted is first modulated with the data-bearer matrix and then pilot data is added thereto. The pilot data may be added to each modulated symbol, thereby increasing significantly the density of pilot information available at the receiver for channel state estimation. When pilot data is added across an entire transmitted block of data, data detection performance is improved for even fast fading Rayleigh fading channels.

18 Claims, 11 Drawing Sheets

DATA COMMUNICATION WITH EMBEDDED PILOT INFORMATION FOR TIMELY CHANNEL ESTIMATION

RELATED APPLICATION DATA

This Application is based on Provisional Patent Application Ser. No. 60/692,462, filed on 21 Jun. 2005.

BACKGROUND OF THE INVENTION

1. Field of the Invention

The invention described herein is related to data communication. More specifically, the invention is related to embedding pilot information into data at a transmitter for obtaining channel state information at a receiver.

2. Description of the Prior Art

Multiple-input multiple-output (MIMO) communication systems beneficially provide high capacity data communication with greater reliability than their single channel counterparts. Space-time (ST) coding has engendered transmit diversity so as to significantly improve the bit error rate (BER) of data transmission without an increase in transmission power. However, a major challenge in realizing such systems lies in providing the coherent detector with channel state information, which is a measure of the effects of the channel on the propagation of the signal. Typically, channel state information is estimated from a known signal transmitted through the channel for such purpose, where the known signal is commonly referred to as a training signal or pilot signal. Training signal techniques are widely applicable and are desirable when low computational complexity is inherent to their implementations.

Common pilot-aided channel estimation techniques for single-input single-output (SISO) and MIMO systems include the pilot symbol assisted modulation (PSAM) technique and the pilot-embedding technique. In PSAM, a pilot signal is time-multiplexed into the transmit data stream, which is then extracted at the receiver and used to ascertain the channel state information. Interpolation of multiple channel estimates is applied over a certain time period to improve accuracy. However, the signal from which channel information is derived is sparsely transmitted, which results in poor state tracking of the channel with respect to time. Unfortunately for these PSAM systems, increasing the time-density of the pilot signal consumes bandwidth otherwise used for real data and thus penalizes the system's efficiency.

Pilot-embedding, also referred to as the pilot-superimposed technique, adds a sequence of pilot signals directly to the data stream. Channel estimation and data detection are accomplished at the receiver through a soft-decoding procedure, such as the Viterbi algorithm. This technique achieves better bandwidth efficiency over PSAM since no time slots are sacrificed for pilot signal use. The pilot-embedding technique does, however, involve higher computational costs in the decoder and a longer delay in the channel estimation process.

The need exists in the field of data communication for channel state information acquisition, which is computationally affordable and able to track channels states in fast-fading channels.

SUMMARY OF THE INVENTION

In one aspect of the invention, a method is provided for data communication in which data symbols are first provided at a transmitter. Pilot data are added to each of the data symbols to form pilot-embedded data symbols, at least one of which is transmitted from a transmitting antenna defining one end of a data channel. At least one of the pilot-embedded data symbols is received at a receiving antenna defining an opposite end of the data channel. At least one channel state coefficient indicative of a characteristic of the data channel is estimated from the received pilot-embedded data symbols. The data symbols are recovered from the received pilot-embedded data symbols using the estimated channel state coefficient.

In another aspect of the invention, a method for data communication is provided which forms a block codeword from a sequence of data symbols. The codeword is modulated with a plurality of data bearing coefficients and a value from a plurality of pilot values is added thereto to form a pilot-embedded codeword. The pilot-embedded codeword is transmitted and subsequently received at a receiver. At least one channel state coefficient indicative of a characteristic of a corresponding data channel is estimated from the received codeword and the sequence of data symbols is recovered from the received pilot-embedded codeword using the estimated channel state coefficient.

In yet another aspect of the invention, a system for data communication is provided which includes a data encoder encoding data received at an input thereof into data symbols produced at an output thereof. A pilot embedder is coupled to the data encoder and adds pilot data to the data symbols to produce pilot-embedded data symbols at an output thereof. The system includes a transmitter coupled to the pilot embedder at an input thereof for transmitting the pilot-embedded data symbols over a plurality of time slots such that the pilot data is transmitted in each time slot. A receiver is coupled to the transmitter via at least one data channel and receives therethrough the pilot-embedded data symbols as modified by a characteristic of the corresponding data channel. A channel estimator is coupled to the receiver and estimates from the pilot data added to each of the data symbols the characteristic of the corresponding data channel for each of the pilot-embedded symbols received. A data detector is coupled to the channel estimator and recovers the data symbols from the pilot-embedded symbols in accordance with the estimated characteristic to produce at an output thereof estimated data symbols. A data decoder coupled to the data detector decodes the estimated data symbols in a manner complementary to the data encoder to reproduce the data at the receiver.

DETAILED DESCRIPTION OF PREFERRED EMBODIMENTS

The present invention simplifies channel estimation and data detection processes by taking advantage of the null-space and orthogonality principles of the data-bearing and pilot structure, as will be succinctly described below by way of certain underlying mathematical models. Exemplary system configurations will also be described that demonstrate implementations of the invention practicable from aspects derived from the models. It is to be noted that while the invention will be described herein primarily with reference to a MIMO embodiment thereof, other embodiments, including SISO embodiments, are within the intended scope of the invention.

In certain MIMO embodiments of the invention, a data-bearer matrix is used for projecting an ST data codeword matrix onto the orthogonal subspace of a pilot matrix. By virtue of the null-space and orthogonality properties, a block of the data matrix subjected to the invention is added into a block of pilot matrix, where the pilot and data matrices are mutually orthogonal. Improvement in channel estimation results from the provision of pilot information in every transmitted block without substantial penalty in computational complexity.

Figure 1:
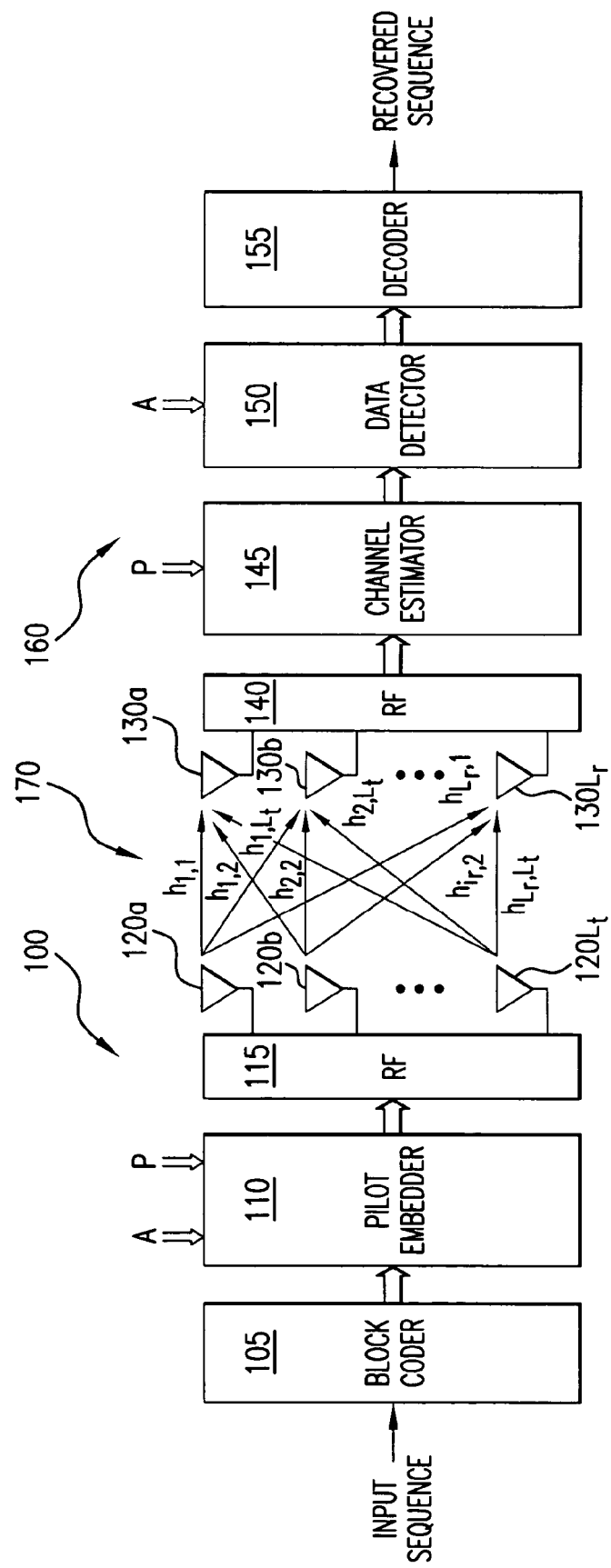
FIG. 1 is a schematic block diagram of an exemplary system implementing the present invention.

Fundamental aspects of the invention are now described in accordance with a MIMO channel and system model. The exemplary MIMO system is illustrated in FIG. 1 and includes $L_t$ transmit antennas at a transmitter 100 and $L_r$ receive antennas at a receiver 160. Generally, for a given block index t, an ST codeword U(t) is characterized by a matrix of $L_t \times M$ symbols transmitted across the $L_t$ transmit antennas over M time slots. The received symbol matrix Y(t) at the receiver front-end can be expressed as:

$$Y(t) = H(t)U(t) + N(t), \quad (1)$$

where H(t) is the $L_r \times L_t$ channel coefficient matrix and the $L_r \times M$ noise matrix N(t) is assumed to be complex white Gaussian distributed with zero mean and variance $\sigma^2/2(I_{L_rM \times L_rM})$ per real dimension. The elements of H(t) are assumed to be independent complex Gaussian random variables with zero mean and variance of 0.5 per real dimension, or, equivalently, an independent flat Rayleigh fading channel is assumed. Unlike many systems of the prior art, the present invention is not limited to environments where quasi-static flat Rayleigh fading channels are presumed, but extends to nonquasi-static flat Rayleigh fading channels, where H(t) changes according to processes whose dominant frequency is much faster than $M^{-1}$. Beneficial features of the invention provide information at the receiver to track the state of the channel even if the channel coefficient matrix H(t) is not constant over each symbol block.

Without loss of generality, a modulated data matrix $Z(t) \in \mathbb{C}^{L_t \times M}$ is defined as:

$$Z(t) = D(t)A, \quad (2)$$

where $D(t) \in \mathbb{C}^{L_t \times N}$ is the ST codeword data matrix, $A \in \mathbb{R}^{N \times M}$ is the data-bearer matrix, and N is the number of data time slots used in each ST codeword. In certain embodiments of the invention, the ST data matrix D(t) is formed to maintain the energy constraint $E[\|D(t)\|^2] = L_t$, with $\|\cdot\|$ being the Frobenius norm. A pilot-embedded symbol matrix of the present invention may then be expressed as:

$$U(t) = Z(t) + P = D(t)A + P, \quad (3)$$

where $P \in \mathbb{R}^{L_t \times M}$ is the pilot matrix.

Figure 2:
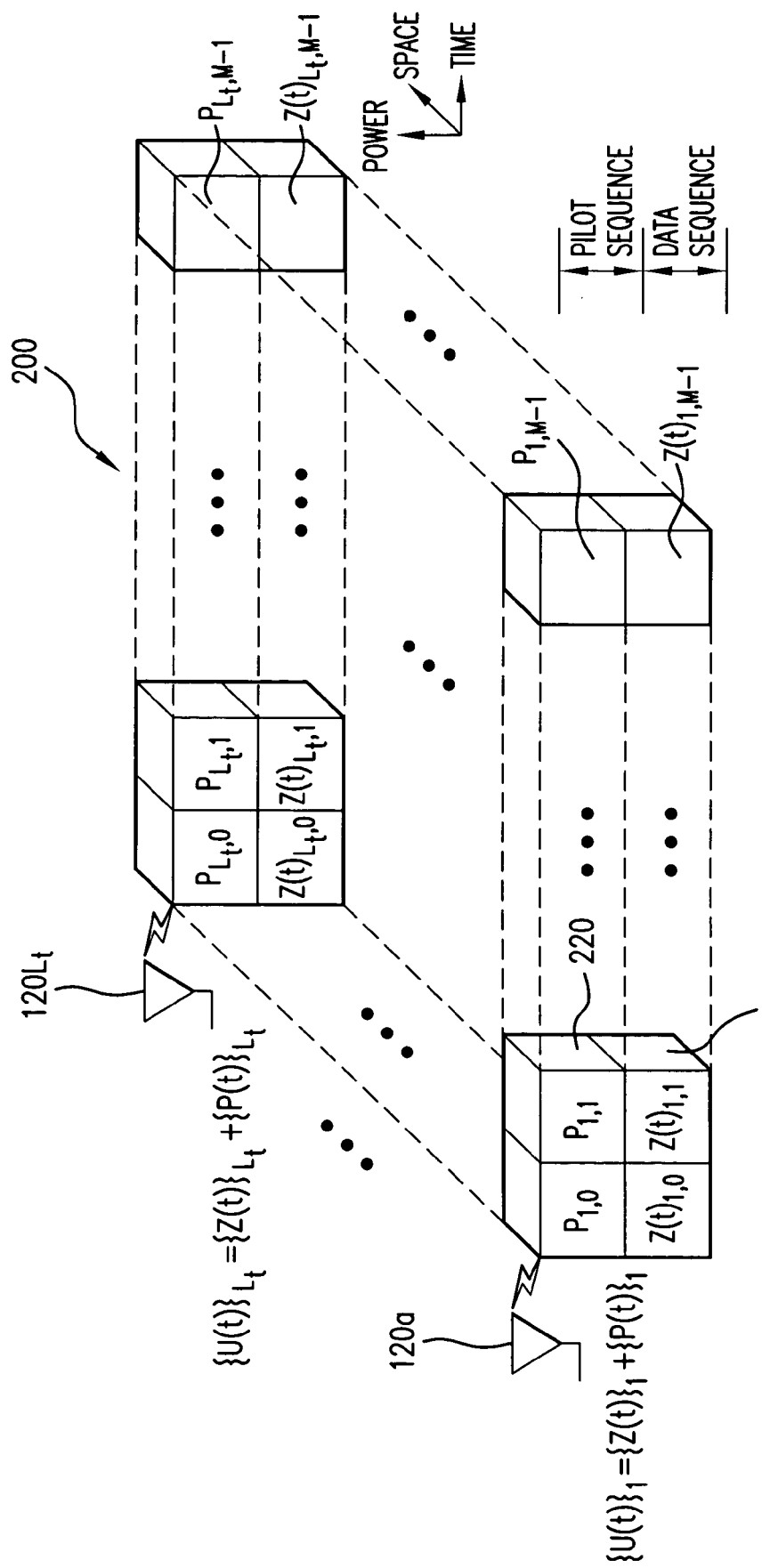
FIG. 2 is a block diagram illustrating an exemplary block coding structure of the present invention.

Referring to FIG. 2, there is shown an exemplary pilot-embedded ST codeword structure 200 in accordance with the present invention. As is shown in the Figure, U(t) includes two main parts: modulated data sequences $\{Z(t)\}_i$ and pilot sequences $\{P\}_i$, where i is the row index $i = 1, \ldots, L_t$. The data sequences $\{Z(t)\}_i$ include data-bearing symbols 210 and the pilot sequences $\{P\}_i$ include pilot symbols 220. As is clear from FIG. 2, the present invention provides pilot information in every time slot and in every spatial stream of the pilot-embedded ST symbol block 200. The pilot-embedded ST symbol block 200 is transmitted into the MIMO channel via transmit antennas 120a-120$L_t$ at block time $t = \lceil(kM+n)/M\rceil$, where $k \in [0, \infty) \in I$, $n \in [0, M-1] \in I$ and $\lceil \cdot \rceil$ returns the largest integer no greater than its argument. Then, substituting Eq. (3) into Eq. (1) reveals that the received symbol matrix Y(t) is:

$$Y(t) = H(t)(D(t)A + P) + N(t) \quad (4)$$

In accordance with the invention, the data bearer matrix A and the pilot matrix P are chosen to satisfy the following:

$$AP^T = 0 \in \mathbb{R}^{N \times L_t} \quad (5)$$

$$PA^T = 0 \in \mathbb{R}^{L_t \times N} \quad (6)$$

$$AA^T = \alpha I \in \mathbb{R}^{N \times N} \quad (7)$$

$$PP^T = \alpha I \in \mathbb{R}^{L_t \times L_t}, \quad (8)$$

where β is a real-valued data power factor for controlling the data-part power and α is a real-valued pilot power factor for controlling the pilot-part power. The matrices 0 and I are the zero matrix and the identity matrix, respectively. The present invention exploits the null-space property of Eqs. (5) and (6) and the orthogonality properties of Eqs. (7) and (8) to enable the embedding of the pilot symbols onto every symbol in the transmitted codeword block in such a manner as to be efficiently recovered at the receiver.

In mathematical terms, the data-bearer matrix A projects the ST data matrix D(t) onto the orthogonal space of the pilot matrix P. Eqs. (7) and (8) imply that Rank (A)=N and Rank (P)=$L_t$, where Rank (•) returns the rank of its matrix argument. To satisfy the null-space requirement of Eqs. (5) and (6), the minimum number of columns in A and P must be equal to the sum of the rank of A and P. Consequently, the number of time slots M of the pilot-embedded ST symbol codeword U(t) must satisfy the inequality:

$$\text{Rank}(A) + \text{Rank}(P) \leq M. \quad (9)$$

Figure 3A:
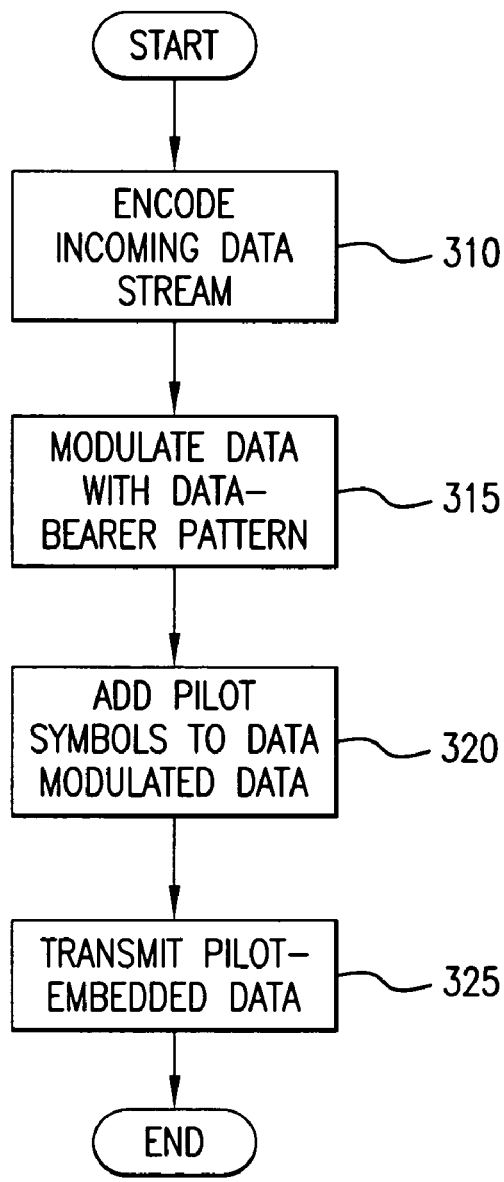
FIG. 3A is a flow diagram illustrating fundamental functional steps in a transmitter of embodiments of the invention.

The present invention establishes the matrices A and P to fulfill the requirements of Eqs. (5)-(8) and applies the symbol patterns formed by the matrices as shown in FIG. 3A. The incoming data stream is encoded at block 310, where error coding is applied, constellation symbols are selected and any block coding is performed. The encoded data is then modulated by the pattern defined by data-bearer matrix A, as indicated at block 315. Such modulation may be performed, for example, by matrix multiplication in a digital signal processor (DSP). Process flow is transferred to block 320, where the pilot data pattern defined by the matrix P is added to the modulated data. The addition of the pilot symbols may be performed by, for example, matrix addition in a DSP. The pilot-embedded data are then transmitted into the channel, as indicated at block 325.

Matrices A and P may be formed in a number of ways to meet the above criteria with varying pilot information density resulting thereby. For example, in a Time-Multiplexing (TM) based system, the structures of the data-bearer and pilot matrices may be:

$$A = \sqrt{\beta}[0_{(N \times L_p)}; I_{(N \times N)}],$$

$$P = \sqrt{\alpha}[I_{(L_p \times L_p)}; 0_{(L_p \times N)}], \quad M = N + L_p. \tag{10}$$

In this embodiment, the pilot signal is based on the $L_p \times L_p$ identity matrix and is multiplexed into the channel separate from the data as modulated by A. The PSAM system previously described is subsumed into this category of system.

In ST-Block-Code (STBC) based systems, the matrices may be:

$$A = \sqrt{\beta}[0_{(N \times \tau)}; I_{(N \times N)}],$$

$$P = \sqrt{\alpha}[STBC_{(L_p \times \tau)}; 0_{(L_p \times N)}], \quad M = N + \tau, \tag{11}$$

where τ is the number of time slots used for transmitting one ST block code of pilot information. The primary difference between this and the TM-based structure is that it employs a normalized known ST block code structure for the pilot block instead of the identity matrix, but still multiplexes the pilot symbols into the data.

In a Code-Multiplexing (CM) based system, exemplary matrices are:

$$A = \sqrt{\beta}WH[1:N]_{(N \times M)},$$

$$P = \sqrt{\alpha}WH[N+1:M]_{(L_p \times M)}, \quad M = N + L_p. \tag{12}$$

where WH[x:y] denotes a sub-matrix created by splitting the M×M normalized Walsh-Hadamard matrix starting with the $x^{th}$ row and ending with the $y^{th}$ row. The pilot information using these matrices is distributed evenly over the transmitted ST symbol block. Certain embodiments of the invention implement pilot embedding processes in accordance with the CM-based matrices to achieve channel estimation which is superior to the other two systems described.

Figure 3B:
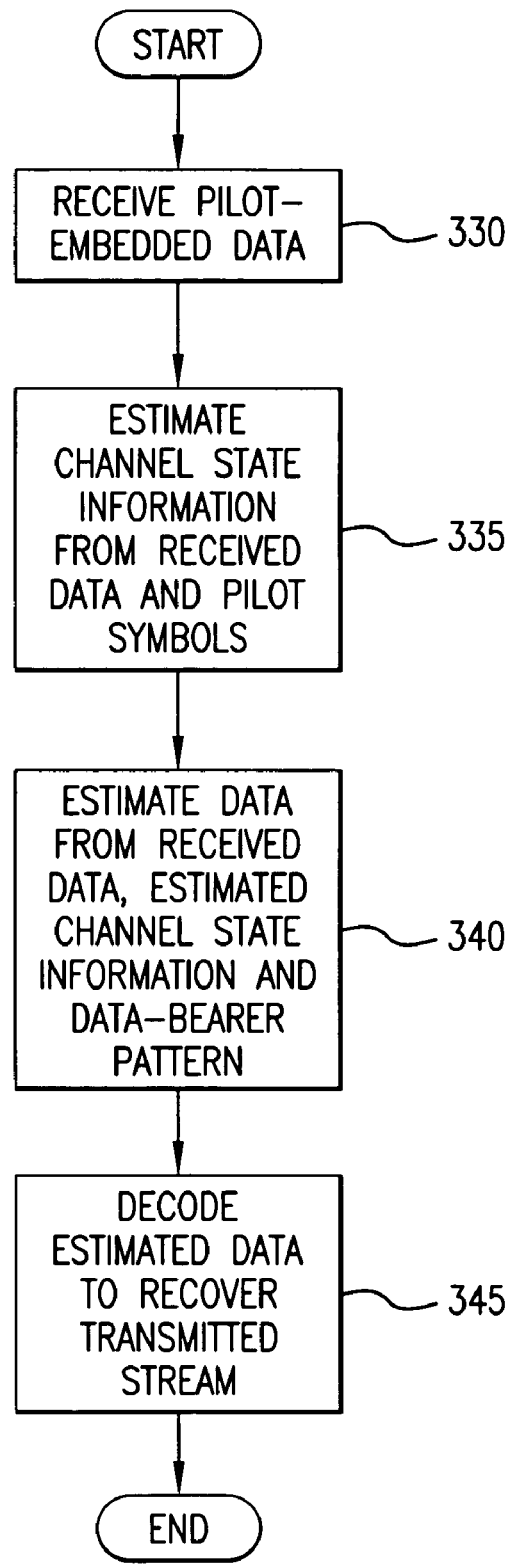
FIG. 3B is a flow diagram illustrating fundamental functional steps in a receiver of embodiments of the invention.

At the receiver end of the channel, the recovery of the original data is achieved through the fundamental method steps of FIG. 3B. The pilot-embedded data are received, as indicated at block 330. Flow is transferred to block 335 where estimation of the channel state information proceeds on the received signal modeled by Eq. (4). Described mathematically, the process begins by post-multiplying the received symbol matrix Y(t) by the transpose of the pilot matrix $P^T$. From the null-space and orthogonality properties of Eqs. (5) and (8) and dividing the result by α, $$\frac{Y(t)P^T}{\alpha} = H(t) + \frac{N(t)P^T}{\alpha}. \tag{13}$$

Defining $$Y_1(t) = \frac{Y(t)P^T}{\alpha} \text{ and } N_1(t) = \frac{N(t)P^T}{\alpha},$$

and with $y(t) \triangleq vec(Y_1(t))$, $n(t) \triangleq vec(N_1(t))$, $h(t) \triangleq vec(H(t))$, where vec(•) concatenates constituent rows or columns of its matrix argument, the received symbol matrix may be rewritten as a vector:

$$y(t) = h(t) + n(t). \tag{14}$$

Using the property that, $$vec(ABC) = (C^T \otimes A)vec(B), \tag{15}$$

where $\otimes$ is the Kronecker product of matrices, the noise term in Eq. (14) is:

$$n(t) = \frac{1}{\alpha}(I \otimes N(t))vec(P^T), \tag{16}$$

where the size of $I \otimes N(t)$ is $L_t L_r \times L_t M$. In the presence of white Gaussian-distributed N(t), the mean of the pilot-projected noise vector n(t) is, $$\mu_{n(t)} = \frac{1}{\alpha}E[(I \otimes N(t))vec(P^T)] = 0_{(L_t L_r \times 1)} \tag{17}$$

and the covariance is given by, $$V_{n(t)} = \tag{18}$$

$$\frac{1}{\alpha^2}E[((I \otimes N(t))vec(P^T))((I \otimes N(t))vec(P^T))^H] = \frac{\sigma^2}{2\alpha^2}Diag(B_i),$$

$$B_i = \sum_{j=1}^{M}|P_{i,j}|^2 I_{(L_r \times L_r)}, \ i \in \{1, \ldots, L_t\}, \text{ per real dimension,}$$

where $P_{i,j}$ is the $i^{th}$ row $j^{th}$ column element of the pilot matrix P, Diag(•) returns a diagonal matrix by concatenating the submatrices of its argument, and superscripted H indicates the complex conjugate transpose of the argument matrix. Using Eq. (8), it is observed that $$\sum_{j=1}^{M}|P_{i,j}|^2 = \alpha, \ \forall \ i.$$

Thus, the covariance matrix can be rewritten to, $$V_{n(t)} = \frac{\sigma^2}{2\alpha}I_{(L_t L_r \times L_t L_r)}, \text{ per real dimension.} \tag{19}$$

The pilot-projected noise vector n(t) is a complex white Gaussian vector and a log-likelihood function can be formed:

$$\ln(p(y(t)|h(t))) = \ln\left(\frac{1}{\pi^L \det(V_{n(t)})}\right) - (y(t) - h(t))^H V_{n(t)}^{-1}(y(t) - h(t)), \quad (20)$$

where $L = L_t L_r$ and $\det(\bullet)$ returns the determinant of its argument.

Eq. (20) serves as a basis for channel estimation, such as through a unconstrained Maximum-Likelihood (ML) channel estimator, which maximizes the log-likelihood function, $$\hat{h}(t) = \max_{h(t)}\{\ln(p(y(t)|h(t)))\}. \quad (21)$$

Differentiating Eq. (20) and equating the result to zero results in, $$\hat{h}(t) = y(t) \text{ or } \hat{H}(t) = Y_1(t), \quad (22)$$

which indicates that the ML estimator is the pilot-projected received vector y(t) (or matrix $Y_1(t)$) itself.

To improve the estimation, certain embodiments of the invention employ an L-tap Linear Minimum Mean-Squared Error (LMMSE) channel estimator. The L-tap LMMSE channel estimator is given mathematically by, $$h_{j,i}^{LMMSE}(t) = w_{j,i}^H \hat{h}_{j,i}^L(t), \quad (23)$$

where $h_{j,i}^{LMMSE}(t)$ denotes the $j^{th}$ row $i^{th}$ column element of the LMMSE-estimated channel matrix, $w_{j,i} = [w_{j,i}(0) \ldots w_{j,i}(L-1)]^T$ denotes the L-tap finite impulse response (FIR) linear filter's weight vector, and $\hat{h}_{j,i}^L(t) = [\hat{h}_{j,i}(t) \ldots \hat{h}_{j,i}(t-L+1)]^T$ denotes the L-element input vector constructed from the $j^{th}$ row $i^{th}$ column element of the ML-estimated channel matrix in Eq. (22) taking values in the time interval $[t-L+1,t]$. The optimization criterion, assuming wide-sense stationary channels, for the L-tap LMMSE estimator is, $$J(w_{j,i}) = \arg\min_{w_{j,i}} E\left[\left\|h_{j,i}(t) - w_{j,i}^H \hat{h}_{j,i}^L(t)\right\|^2\right], \quad (24)$$

where $h_{j,i}(t)$ denotes the $j^{th}$ row $i^{th}$ column element of the true channel matrix H(t) in Eq. (1), i.e., the channel state information if perfect knowledge of such were obtainable.

The optimal LMMSE weight vector $w_{j,i}^{opt}$ is given by, $$w_{j,i}^{opt} = R_{\hat{h}_{j,i(t)}^L}^{-1} p_{\hat{h}_{j,i(t)}^L}, \quad (25)$$

where $R_{\hat{h}_{j,i}^L(t)} = E[\hat{h}_{j,i}^L(t)\hat{h}_{j,i}^{HL}(t)]$ and $p_{\hat{h}_{j,i}^L(t)} = E[h_{j,i}^*(t)\hat{h}_{j,i}^L(t)]$. Taking Eqs. (14), (19) and (22) and considering that the channel and noise coefficients are uncorrelated, the autocorrelation matrix $R_{\hat{h}_{j,i}^L(t)}$ may be simplified to, $$R_{\hat{h}_{j,i(t)}^L} = R_{h_{j,i(t)}^L} + \frac{\sigma^2}{\alpha} I_{L \times L}, \quad (26)$$

where $R_{h_{j,i}^L(t)} = E[h_{j,i}^L(t)h_{j,i}^{HL}(t)]$ and $h_{j,i}^L(t) = [h_{j,i}(t) \ldots h_{j,i}(t-L+1)]^T$. Similarly, the cross-correlation vector $P_{\hat{h}_{j,i}^L(t)}$ can be simplified to, $$p_{\hat{h}_{j,i}^L(t)} = E[h_{j,i}^*(t)h_{j,i}^L(t)] = p_{h_{j,i}^L(t)}. \quad (27)$$

Substituting Eqs. (26) and (27) into Eq. (25), and then substituting the result into Eq. (23), the LMMSE channel estimator can be written as:

$$h_{j,i}^{LMMSE}(t) = \left[\left(R_{h_{j,i(t)}^L} + \frac{\sigma^2}{\alpha} I_{L \times L}\right)^{-1} p_{h_{j,i(t)}^L}\right]^H \hat{h}_{j,i}^L(t). \quad (28)$$

The channel estimation process 335, as described through its underlying mathematics above, may be achieved through programmed instruction sequences on a DSP.

As is shown in FIG. 3B, once the channel estimates have been obtained, flow is transferred to block 340, where the data detection process is executed. The data part of the received signal is extracted by post-multiplying the received symbol matrix Y(t) by the transpose of the data bearer matrix A. Using the null-space and orthogonality properties of Eqs. (6) and (7), and dividing by β, the data-bearer projected received symbol matrix is given by, $$\frac{Y(t)A^T}{\beta} = H(t)D(t) + \frac{N(t)A^T}{\beta}. \quad (29)$$

Defining $$Y_2(t) = \frac{Y(t)A^T}{\beta} \text{ and } N_2(t) = \frac{N(t)A^T}{\beta},$$

Eq. (29) may be rewritten as, $$Y_2(t) = H(t)D(t) + N_2(t). \quad (30)$$

Now, defining $n'(t) = \text{vec}(N_2(t))$, observing from Eq. (7) that $$\sum_{j=1}^{M} |A_{i,j}|^2 = \beta, \forall i$$

and following from the preceding analysis of P, the statistics of the data-bearer projected noise vector n'(t) are, $$\mu_{n'(t)} = 0_{(L_r N \times 1)}, \quad (31)$$

$$V_{n'(t)} = \frac{\sigma^2}{2\beta} I_{(L_r N \times L_r N)} \text{ per real dimension}, \quad (32)$$

where $\mu_{n'(t)}$ and $V_{n'(t)}$ are the mean vector and covariance matrix of the data-bearer projected noise vector n'(t), respectively.

In certain embodiments of the invention, a maximum likelihood receiver is employed for detecting the transmitted data matrix D(t) by using the estimated channel coefficient matrix $\hat{H}(t)$ as the channel state information. Since n'(t) is i.i.d. white Gaussian, a suitable maximum likelihood receiver computes a decision metric and selects a codeword that minimizes the decision metric, such as.

$$\{\hat{d}_i\} = \min_{\{d_i\}} \left\{ \sum_{t=1}^{N} \sum_{j=1}^{L_r} \left| y_t^j - \sum_{i=1}^{L_t} \hat{h}_{j,i} d_t^i \right|^2 \right\}, \quad (33)$$

$$\forall d_t^i, i \in \{1, \ldots, L_t\}, t \in \{1, \ldots, N\},$$

where $y_t^j$ denotes the $j^{th}$ row $t^{th}$ column element of the data-bearer projected received symbol matrix $Y_2(t)$, $\hat{h}_{j,i}$ denotes the $j^{th}$ row $i^{th}$ column of the estimated channel matrix $\hat{H}(t)$, and $\hat{d}_t^i$ denotes the $i^{th}$ row $t^{th}$ column of the estimated ST data matrix $\hat{D}(t)$. The ML receiver may be implemented through programmed instruction steps on a DSP.

Once the data estimates have been acquired, the process of FIG. 3B proceeds to block 345, where the data estimates are decoded in a manner complementary to that at the receiver, thereby recovering the original data stream.

Referring once again to FIG. 1, the exemplary system configuration is now viewed in light of the descriptions above. The system of FIG. 1 is intended to illustrate the fundamental functional blocks of a data communication system consistent with the present invention. Certain of the functions illustrated may be carried out on respective DSPs at the receiver and transmitter ends or may be implemented in discrete single functional modules. Moreover, although the system is illustrated as a MIMO system, the number of antennas at the receiver 160 and transmitter 100 may include the single antenna case at both locations to implement an SISO system operating consistent with the present invention.

As is illustrated in the Figure, the input sequence is provided at the transmitter 1100 to block coder 105, which encodes the incoming data into a block codeword D(t). Such coding may include forward error correction coding, constellation symbol selection and ST block coding. The codeword D(t) is provided to pilot embedder 110, where the codeword is modulated by a data pattern consistent with matrix A and the pilot symbols are added in accordance with the embedding scheme chosen from, for example, the matrix structures described above. Preferably, the system will embed the pilot information in each symbol of the modulated codeword, such as through the CM based system described above. The pilot-embedded codeword is then transmitted into the MIMO channel 170 by a suitable RF transmitter and antennas 120a-120$L_t$.

At the receiver 160, the codeword is received by RF module 140 and is provided to channel estimator 145. The channel estimator, which is provided with knowledge of the matrix P, such as through storing a copy thereof in a memory device, is preferably a LMMSE estimator to provide the estimated channel state information $\hat{H}(t)$ to ascertain the characteristics of the channel. The estimated channel state information and the received codeword are provided to data detector 150, which determines the estimated codeword $\hat{D}(t)$ from the estimated channel state information and a copy of the matrix A. The data detector 150 maintains a copy of the data-bearer matrix A, such as by storing such in a memory device. The estimated codeword is decoded by decoder 155 in a manner complementary to the coding operation at the transmitter 100. The decoder then produces the recovered sequence. Numerical examples of the signal processing and performance are given below.

As was indicated above, the values $\alpha$ and $\beta$ may be used to control power allocation to each of the data and pilot portions of the signal. It should be clear to the skilled artisan that performance of a data communication system is dependent on the power percentages of the data and pilot portions. Considering a MIMO system where the power of the pilot-embedded ST symbol matrix U(t) is constant, the block power allocated to U(t) normalized to the number of transmit antennas $L_t$ can be expressed as, $$P_s = \frac{E[\|U(t)\|^2]}{L_t} \quad (34)$$

$$= \frac{E[\|D(t)A\|^2]}{L_t} + \frac{E[\|P\|^2]}{L_t}$$

$$= P_s' + P_p$$

$$= \beta + \alpha,$$

where $p_s' = \beta$ is the normalized block power allocated to the data part and $P_p = \alpha$ is the normalized block power allocated to the pilot part.

To determine the optimal power allocation, a Probability of Error Upper Bound (PEUB) mismatch factor is defined as, $$\eta = \ln\left(\frac{P(d \to e)_{\hat{H}(t)}}{P(d \to e)_{H(t)}}\right) \quad (35)$$

$$= L_t L_r \ln\left(\frac{P_s\left(\frac{N}{\beta} + \frac{L_t}{\alpha}\right)}{N\left(1 + \frac{\sigma^2}{\alpha}\right)}\right).$$

In Eq. (35), $P(d \to e)_{\hat{H}(t)}$ is the Chernoff's upper bound of the probability of transmitting a codeword $d \triangleq (d_1^1 d_1^2 \ldots d_1^{L_t} \ldots d_N^1 d_N^2 \ldots d_N^{L_t})^T$ and deciding in favor of a different codeword $e \triangleq (e_1^1 e_1^2 \ldots e_1^{L_t} \ldots e_N^1 e_N^2 \ldots e_N^{L_t})^T$ at the ML receiver given the channel estimate $\hat{H}(t)$. Similarly, $P(d \to e)_{H(t)}$ is the Chernoff's upper bound of the probability of such a decision given perfect knowledge of the channel state information through H(t).

Minimizing the PEUB mismatch factor $\eta$ with respect to the pilot-power factor $\alpha$ subject to the constraints of constant block power and acceptable MSE of the channel estimation optimizes the power allocation and is implemented as such in certain embodiments of the invention. Substituting $\beta = P_s - \alpha$ into Eq. (35), the minimization problem is given by, $$\min_{\alpha}\left(\frac{(N - L_t)\alpha + P_s L_t}{(\alpha + \sigma^2)(P_s - \alpha)}\right), \quad (36)$$

where MSE$\leq$T with T being a predetermined acceptability threshold. Differentiating Eq. (36) and equating the result to zero provides the optimal pilot power factor, $$\alpha^* = \begin{cases} \dfrac{P_s - \sigma^2}{2}, & N = L_t \\ \dfrac{P_s L_t - \sqrt{P_s N(P_s L_t + \sigma^2(L_t - N))}}{(L_t - N)}, & N \neq L_t \end{cases} \quad (37)$$

where the MSE of the channel estimation must satisfy, $$MSE = \frac{\sigma^2 L_t L_r}{\alpha} \leq T. \quad (38)$$

The remaining amount of fixed power is then $\beta = P_s - \alpha^*$.

The optimum pilot power factor $\alpha^*$ exists for $N \neq L_t$ if and only if the signal-to-noise ratio (SNR) is at least $(N-L_t)$. For the case where $N=L_t$ and the SNR satisfies, $$L_t + \frac{2L_t^2 L_r}{T} \leq SNR < \infty, \quad (39)$$

the range of the optimum pilot power factor is given by, $$\frac{L_t L_r P_s}{T + 2L_t L_r} \leq \alpha^* < \frac{P_s}{2}. \quad (40)$$

It follows that for $N=L_t$, $$\alpha^* = \begin{cases} \frac{L_t L_r P_s}{T + 2L_t L_r}, & SNR < L_t + \frac{2L_t^2 L_r}{T} \\ \frac{P_s - \sigma^2}{2}, & \text{Otherwise} \end{cases}. \quad (41)$$

Certain aspects of the invention will now be demonstrated through numerical examples. An orthogonal ST block code is formed according to:

$$D(t) = \begin{bmatrix} s_1(t) & -s_2^*(t) & \frac{s_3^*(t)}{\sqrt{2}} & \frac{s_3^*(t)}{\sqrt{2}} \\ s_2(t) & s_1^*(t) & \frac{s_3^*(t)}{\sqrt{2}} & -\frac{s_3^*(t)}{\sqrt{2}} \\ \frac{s_3(t)}{\sqrt{2}} & \frac{s_3(t)}{\sqrt{2}} & \frac{-s_1(t)-s_1^*(t)+s_2(t)-s_2^*(t)}{2} & \frac{s_2(t)+s_2^*(t)+s_1(t)-s_1^*(t)}{2} \\ \frac{s_3(t)}{\sqrt{2}} & -\frac{s_3(t)}{\sqrt{2}} & \frac{-s_2(t)-s_2^*(t)+s_1(t)-s_1^*(t)}{2} & -\frac{s_1(t)+s_1^*(t)+s_2(t)-s_2^*(t)}{2} \end{bmatrix}, \quad (42)$$

where $s_i(t)$, $i \in \{1, \ldots, 3\}$ are the ST symbols corresponding to the chosen modulation constellation, e.g., 4-PSK (Phase-Shift Keying), 8-PSK. For comparison, a set of TM based matrices will be, $$A_{TM} = \sqrt{\beta} \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}, \quad (43)$$

$$P_{TM} = \sqrt{\alpha} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix},$$

and a set of STBC based matrices will be, $$A_{STBC} = \sqrt{\beta} \begin{bmatrix} 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}, \quad (44)$$

$$P_{STBC} = \sqrt{\frac{\alpha}{3}} \begin{bmatrix} 1 & -1 & \frac{1}{\sqrt{2}} & \frac{1}{\sqrt{2}} & 0 & 0 & 0 & 0 \\ 1 & 1 & \frac{1}{\sqrt{2}} & -\frac{1}{\sqrt{2}} & 0 & 0 & 0 & 0 \\ \frac{1}{\sqrt{2}} & \frac{1}{\sqrt{2}} & -1 & 1 & 0 & 0 & 0 & 0 \\ \frac{1}{\sqrt{2}} & \frac{1}{\sqrt{2}} & -1 & -1 & 0 & 0 & 0 & 0 \end{bmatrix}.$$

The data-bearer and pilot matrices for the CM based system will be, $$A_{CM} = \sqrt{\frac{\beta}{8}} \begin{bmatrix} 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}, \quad (45)$$

$$P_{CM} = \sqrt{\frac{\alpha}{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \end{bmatrix}.$$

The three different embedding structures derived from Eqs. (10)-(12), respectively, will be evaluated in both quasi-static and nonquasi-static flat Rayleigh fading channels. In the nonquasi-static scenarios, the performances of the pilot-embedded MIMO systems are demonstrated for channels of varying Doppler shift representing different mobility speeds of a moving receiver. The bit error rate (BER) and MSE will be used as a performance measure against ideal channel coefficients, i.e., where perfect channel state information is given. In the demonstrations, the perfectly known channel cases do not contain pilot information, i.e., the transmitted ST codeword U(t) is simply U(t)=D(t)A. Additionally, pilot-embedded MIMO systems are compared having power allocation in accordance with the optimal allocation described above and having power allocation of the prior art. In the demonstrations, the transmit rate and total transmit energy are the same for all schemes.

For all three data bearer and pilot structures, the noise term N(t) is established to be independent complex Gaussian random variables with zero mean and variance $\sigma^2/2$ per real dimension. The normalized ST symbol block power $P_s$ is one (1) W/ST symbol block. The number of time slots M is 8 time slots per ST symbol block and the number of transmit antennas $L_t$ is four (4). The number of data time slots $N=M-L_t$ is four (4) time slots/ST codeword symbol block. The modulation scheme is 4-PSK and the acceptable threshold of the MSE of the channel estimation T is set to 0.5. The number of LMMSE estimator taps is set to three (3).

In the quasi-static flat Rayleigh fading channel, the channel coefficients are taken from normalized time-varying channel modeled in accordance with that of "Multipath Interference", Jakes, Jr., W. C., *Microwave Mobile Communication*, W. C. Jakes, Jr., Ed., Wiley, NY, pp. 67-68. The fast fading is simulated using $fd*T_s=0.08$, where fd is the Doppler shift and $T_s$ is the symbol period.

Figure 4:
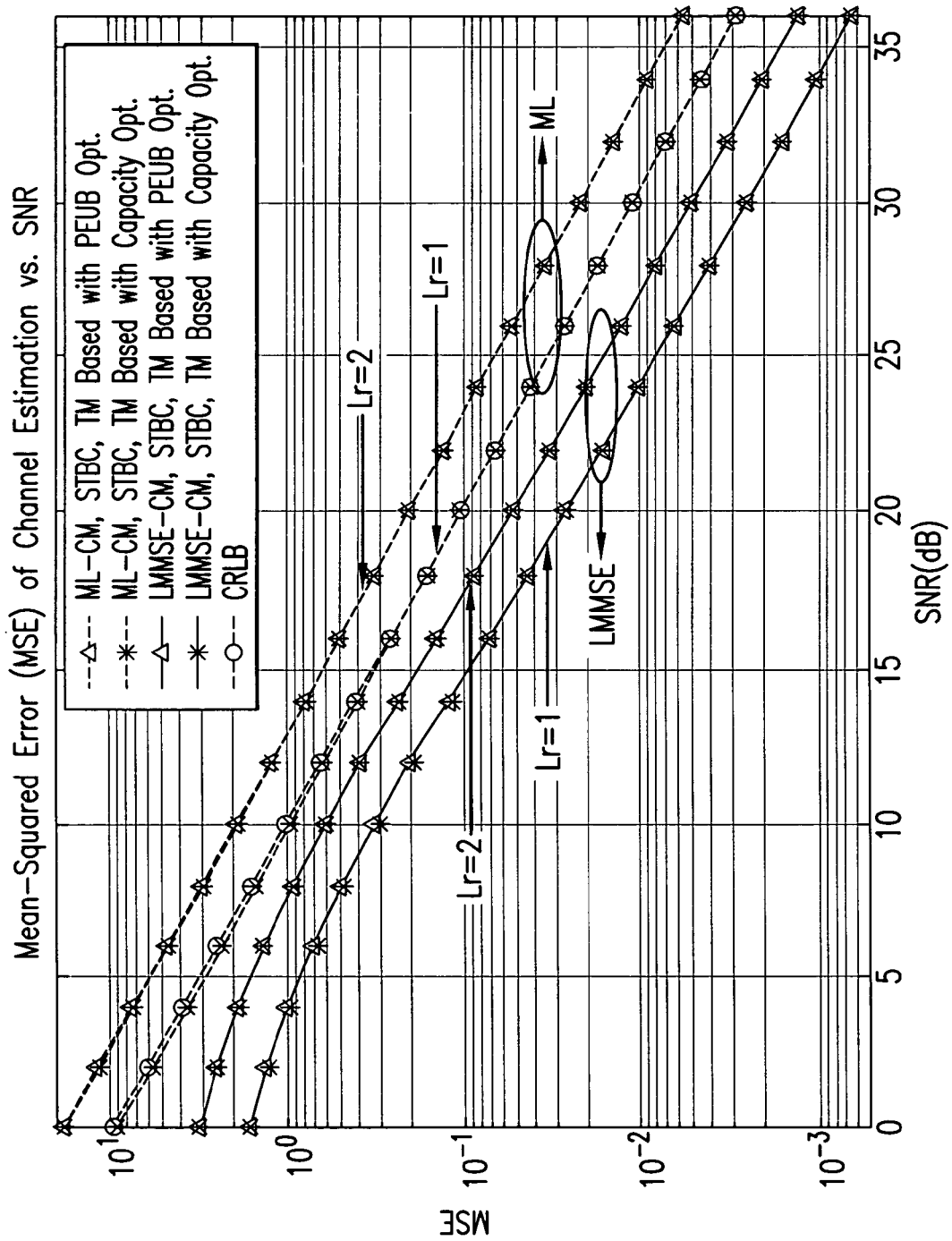
FIG. 4 is a graph comparing system performance in terms of mean-square-error (MSE) in a quasi-static flat Rayleigh fading channel of the invention and of the prior art.

FIG. 4 shows the MSEs of the channel estimation of the pilot-embedded MIMO system having optimal power allocation and that of the prior art with a single receive antenna and two receive antennas $L_r$. It is to be observed from the Figure that the LMMSE channel estimator outperforms the simple ML estimator as shown by the MSE of both processes.

Figure 5:
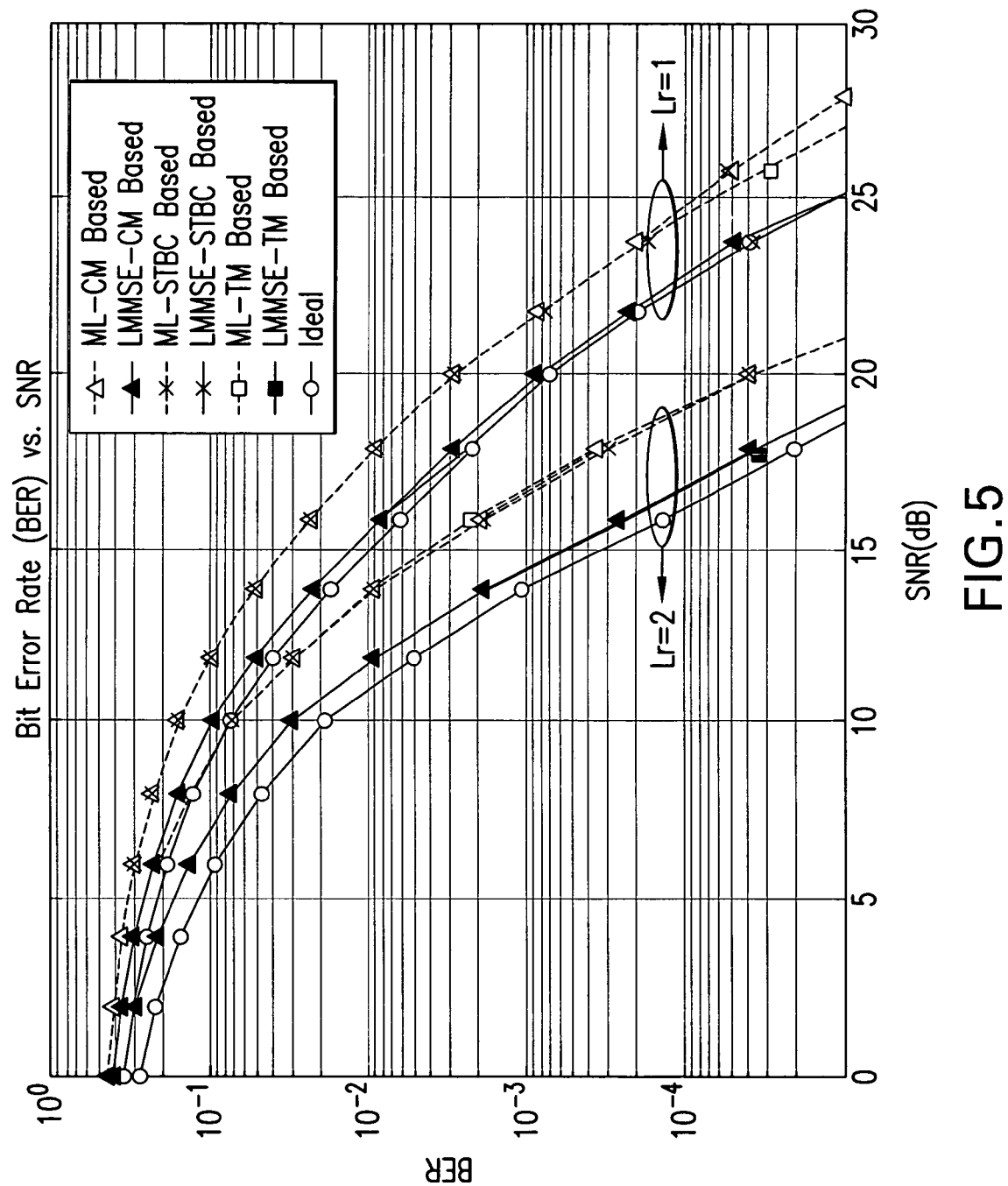
FIG. 5 is a graph of system performance in terms of bit error rate (BER) in a quasi-static flat Rayleigh fading channel for different configurations consistent with the invention.

In FIG. 5, the BERs of the pilot-embedded MIMO system having optimal power allocation consistent with the present invention is demonstrated against the ideal MIMO system. Again, the cases of $L_r=1$ and $L_r=2$ are shown. It is to be observed that, at $BER=10^{-4}$, the difference in SNR between the ideal channel, i.e., where perfect knowledge of the channel state is assumed, and the ML channel estimator is about 2.3 dB for both one and two antenna receiver systems. The LMMSE estimator, on the other hand, achieves ideal-channel error probability for the single antenna receiver and about 0.5 dB for the two antenna receiver.

Figure 6:
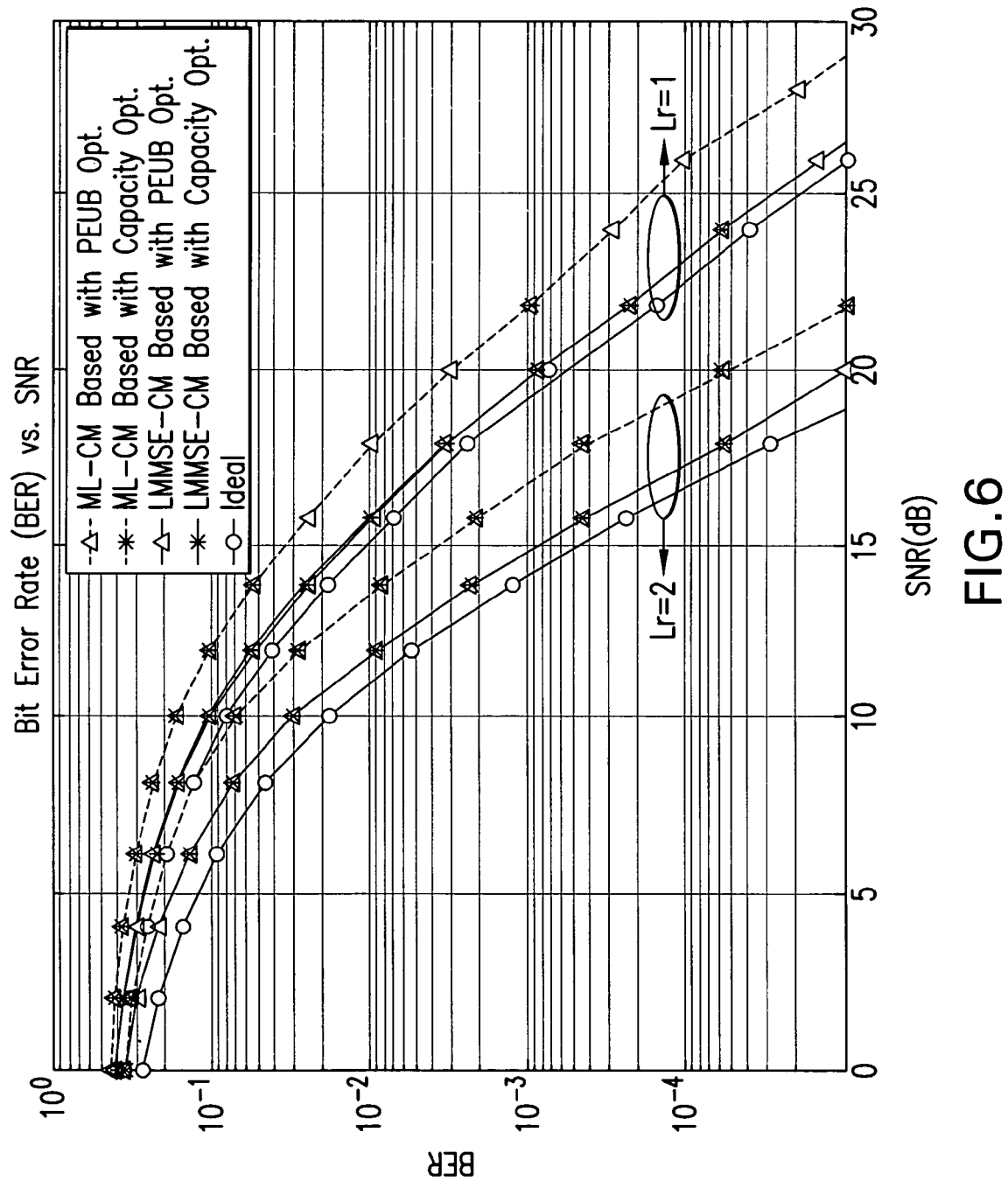
FIG. 6 is a graph comparing system performance in a quasi-static flat Rayleigh fading channel, when power is allocated to data and pilot information in accordance with aspects of the present invention, to a power allocation strategy of the prior art.
Figure 7:
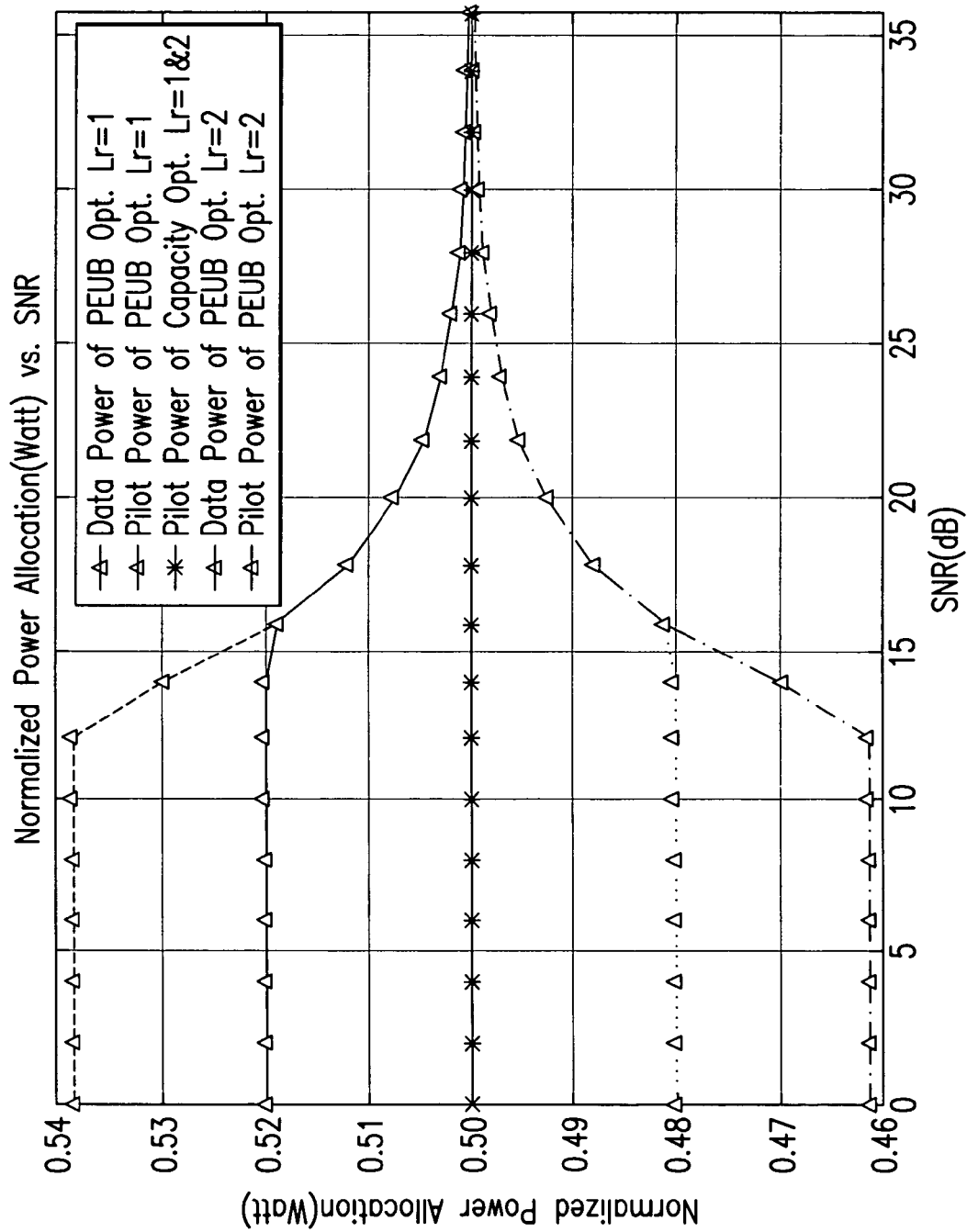
FIG. 7 is a graph of normalized power allocated to data and pilot portions in a power allocation scheme consistent with aspects of the present invention.

Referring to FIG. 6, there is shown a comparison in terms of BER between the optimal power allocation scheme of the present invention and that of the prior art. The comparison is made in both one and two antenna receivers with the CM based data-bearer and pilot matrices applied. It is noteworthy that the two power allocation schemes are quite close at $BER=10^{-4}$, resulting from the very small difference in allocated power between the two strategies in that region, as illustrated in FIG. 7.

In nonquasi-static fading channels, the channel coefficient matrix H(t) is not constant over a ST symbol block. In the demonstrations that follow, the channel state information H(t) changes symmetrically twice over one ST symbol block.

Figure 8:
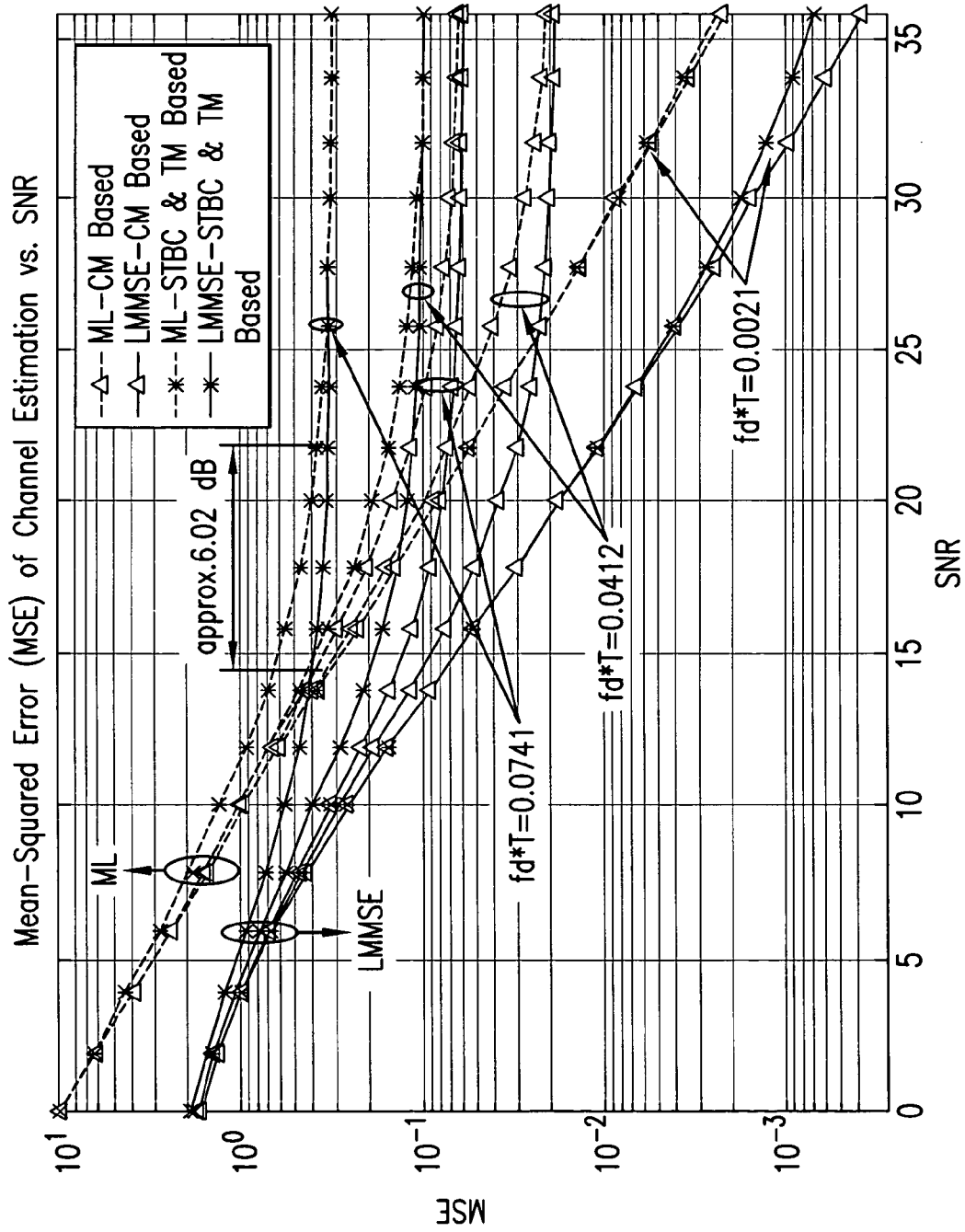
FIG. 8 is a graph of MSE performance of an exemplary single receiver antenna system in a nonquasi-static flat Rayleigh fading channel using pilot information provided in accordance with the present invention.

The single antenna receiver operating in nonquasi-static fading conditions under the present invention is illustrated in FIG. 8. The fading dynamic is illustrated for $fd*T_s=0.0021$ (slow fading), 0.0165, 0.0142 and 0.0741 (fast fading). It is particularly noteworthy that the CM based matrices provide lower MSE than either of the TM and STBC matrix structures. The difference is quite apparent in the higher SNR regions.

Figure 9:
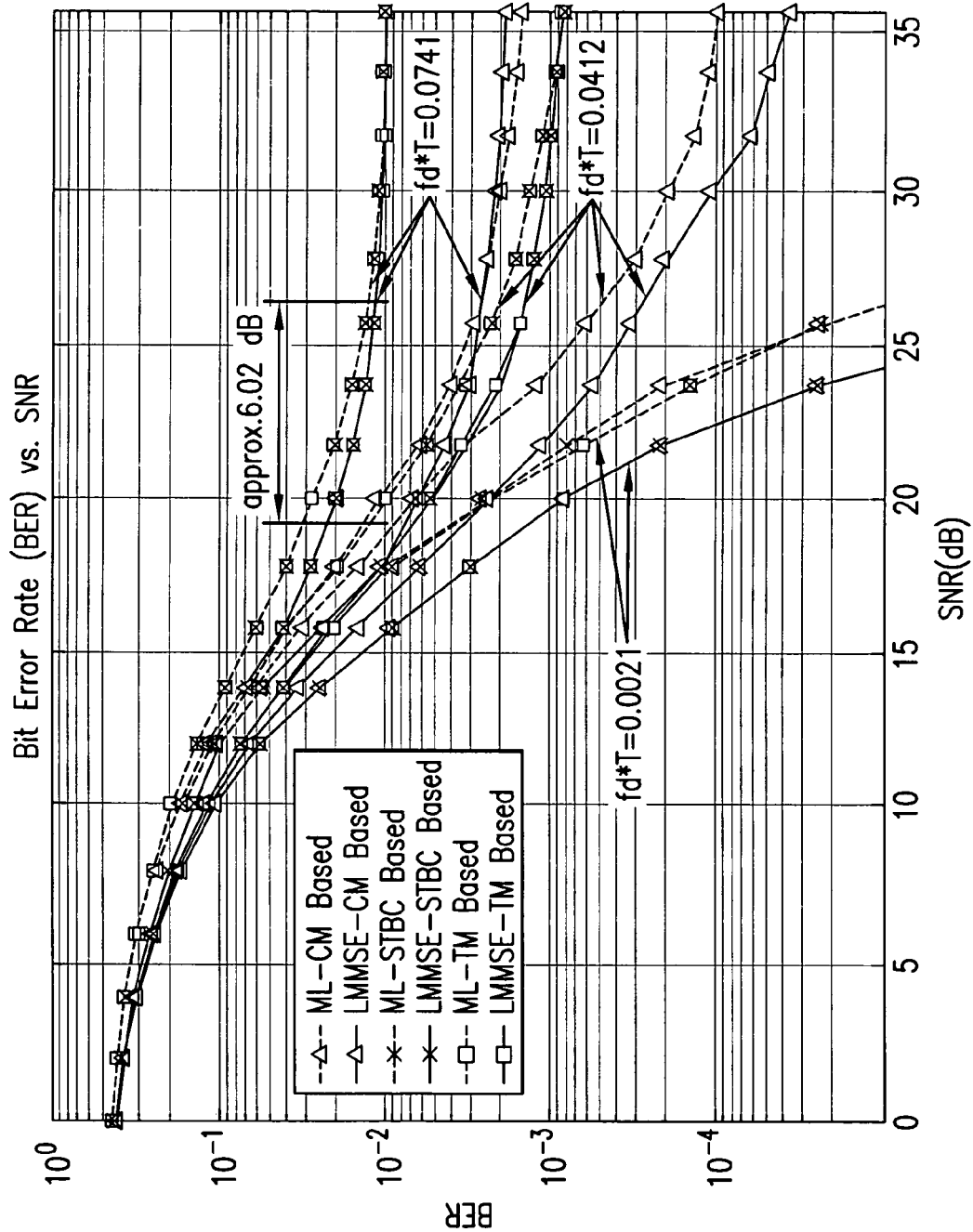
FIG. 9 is a graph of BER performance of an exemplary single receiver antenna system in a nonquasi-static flat Rayleigh fading channel and different embedder/detector configurations consistent with the present invention.

The BERs of the single antenna receiver pilot-embedded systems in the previously defined nonquasi-static fading are illustrated in FIG. 9. It is to be noted that when the $fd*T_s$ is small, all three matrix structures produce similar results. However, when the Doppler shift increases, the CM based embedding structure provides much better detection than either of the TM and STBC structures.

Figure 10:
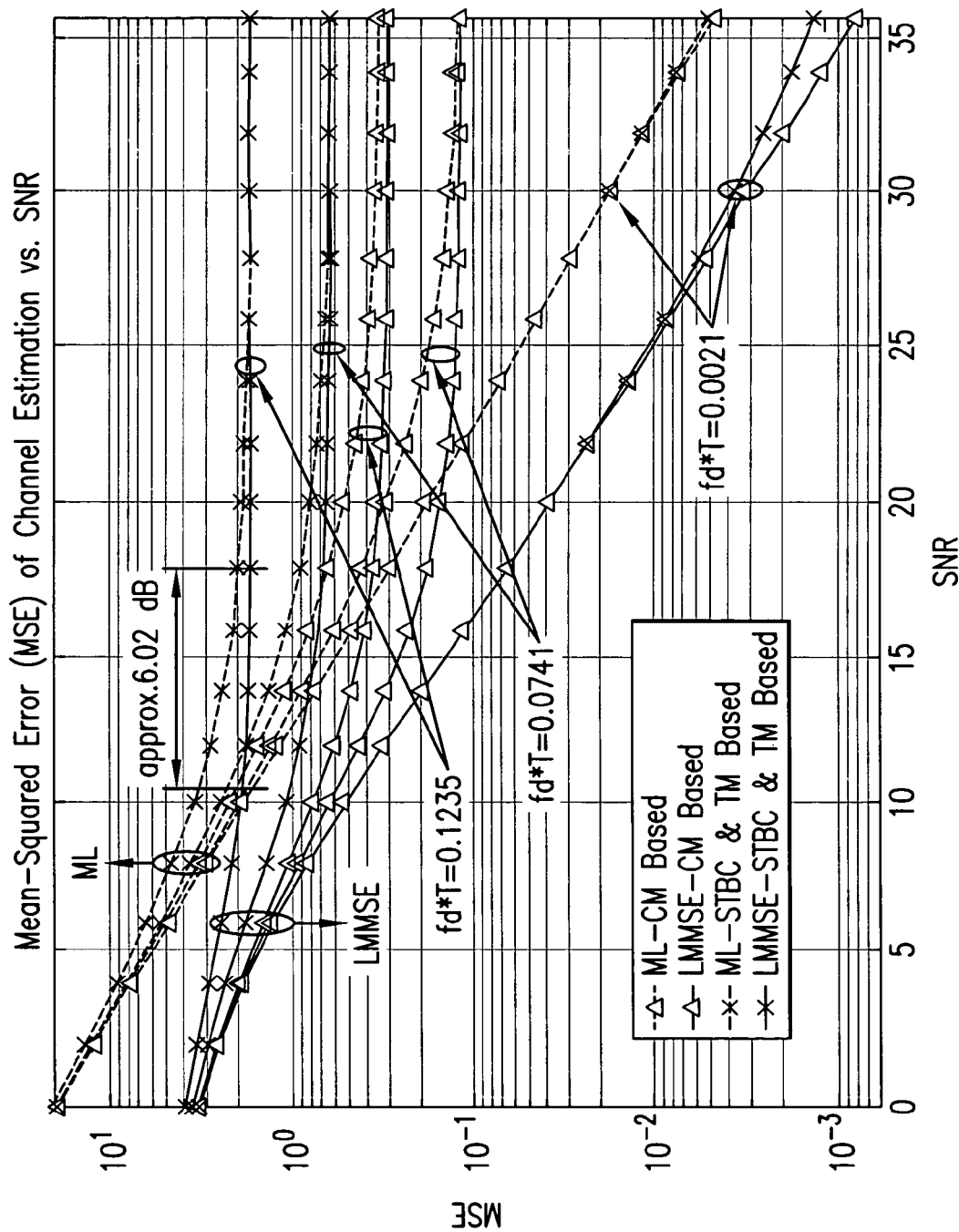
FIG. 10 is a graph of MSE performance of an exemplary dual antenna receiver system in a nonquasi-static flat Rayleigh fading channel using pilot information provided in accordance with the present invention.
Figure 11:
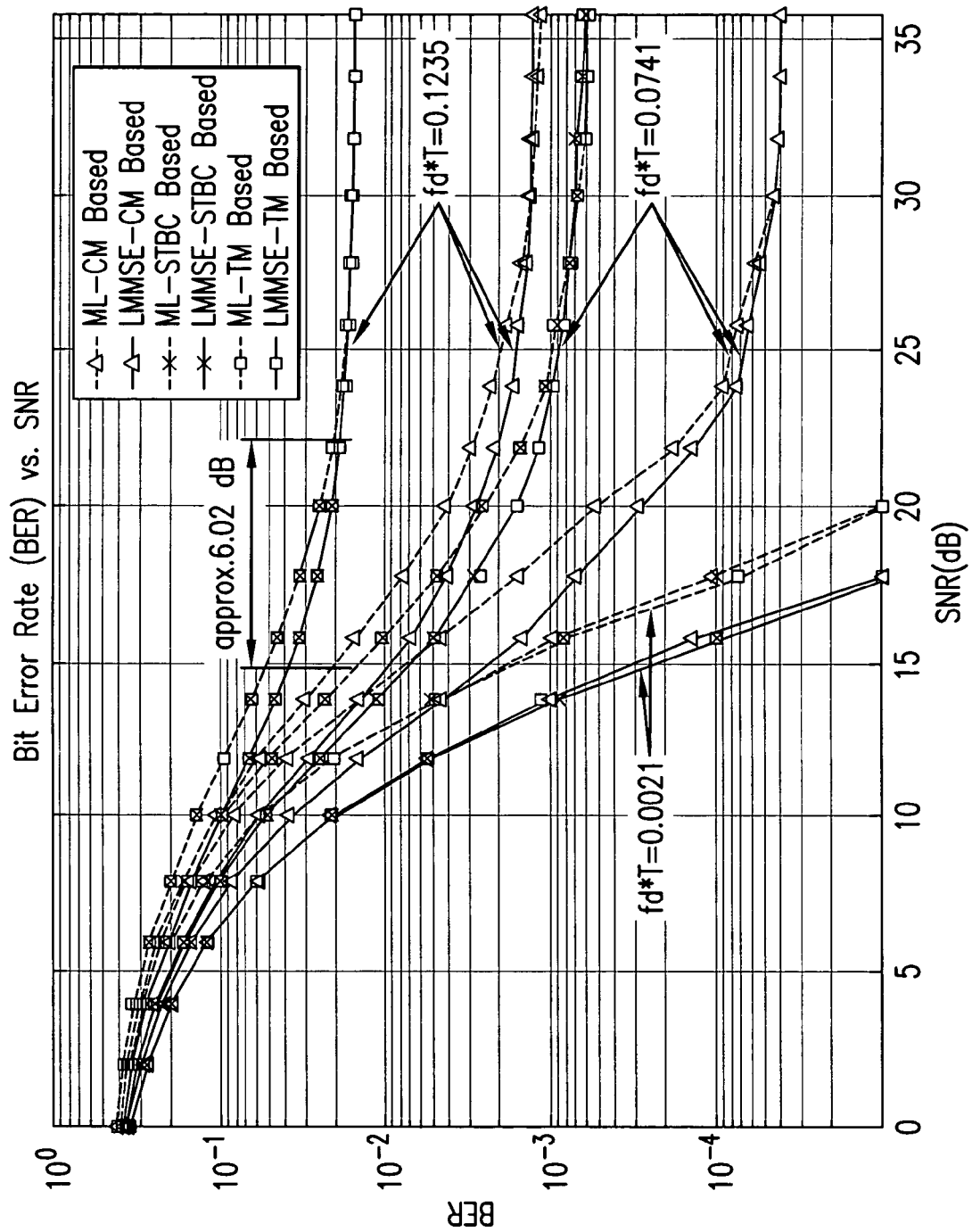
FIG. 11 is a graph of BER performance of an exemplary dual antenna receiver system in a nonquasi-static flat Rayleigh fading channel and different embedder/detector configurations consistent with the invention.

FIGS. 10 and 11 illustrate the scenarios of FIGS. 8 and 9, but where two receiver antennas are deployed. Again, the CM based embedding system provides the best results in terms of both MSE of channel estimation and BER of data detection.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefor, elements and methods individually described may be combined, and elements described as discrete may be distributed across many components. The scope of the invention should therefore be determined not with reference to the description above, but with reference to the appended Claims, along with their full range of equivalents.

What is claimed is:

1. A pilot-embedded data transmission and channel estimation method for a Multiple-Input Multiple-Output (MIMO) communication system comprising the steps of:
   selecting a data-bearer matrix "A" and a pilot matrix "P" based on orthogonality constraints;
   allocating respective fractions of a fixed amount of transmission power to said data-bearer matrix "A" and said pilot matrix "P";
   converting a space-time codeword data matrix "D" into pilot-embedded data matrix to be transmitted according to said fixed amount of transmission power;
   transmitting at least one of said pilot-embedded data matrix from a transmitting antenna defining one end of a data channel;
   receiving at least one of said pilot-embedded data matrix at a receiving antenna defining an opposite end of the data channel;
   estimating from said received pilot-embedded data matrix at least one channel state coefficient indicative of a characteristic of the data channel by a hybrid channel estimation; and
   recovering said space-time codeword data matrix "D" from said received pilot-embedded data matrix using said estimated channel state coefficient.

2. The method for data communication as recited in claim 1, wherein said channel state estimating step includes the steps of:
   estimating said channel state coefficient from said received pilot-embedded data matrix by a first estimation and said predetermined data pattern; and
   updating said estimated channel state coefficient by a second estimation.

3. The method as recited in claim 1, wherein the step of selecting the data-bearer matrix "A" and the pilot matrix "P", comprises of:
   selecting the data-bearer matrix "A" with orthogonal rows and the pilot matrix "P" with orthogonal rows so that multiplication of one by the other results in a zero matrix.

4. The method as recited in claim 1, wherein the step of allocating fractions of a fixed amount of transmission power further includes:
   minimizing the probability of error upper bound of a mismatch between said estimated channel state coefficient and perfect knowledge of said transmission channel state to said pilot matrix "P"; and
   scaling by a respective scaling factor each of pilot matrix "P" coefficients and said data bearer matrix coefficients in accordance with said power allocation.

5. The method as recited in claim 1, wherein the pilot-embedded data matrix is formed by multiplying said space-time codeword data matrix "D" with the data-bearer matrix "A" which is scaled according to the transmission power and further adding said pilot matrix "P" which is scaled according to the transmission power.

6. The method as recited in claim 1, wherein the hybrid channel estimation method includes the steps of:

acquiring an initial channel coefficient vector estimate as the pilot-projected received vector using the maximum likelihood technique; and acquiring an improved channel coefficient vector estimate by performing an L-tap linear minimum mean-squared error estimator based on said initial vector and the previously estimated channel coefficient vectors.

7. A pilot-embedded data transmission and channel estimation method for a Multiple-Input Multiple-Output (MIMO) communication system comprising the steps of:

forming a block codeword from a sequence of data matrix;

modulating said codeword with a plurality of data bearing coefficients;

adding to each symbol in said modulated codeword a value from a plurality of pilot values to form a pilot-embedded codeword;

transmitting said pilot-embedded codeword;

receiving said pilot-embedded codeword at a receiver;

estimating from said received pilot-embedded codeword at least one channel state coefficient indicative of a characteristic of a corresponding data channel;

recovering said sequence of data matrix from said received pilot-embedded codeword by said estimated channel state coefficient;

allocating respective fractions of a fixed amount of power for transmission of said pilot-embedded codeword to each of said modulated codeword and said plurality of pilot values;

allocating said fraction of power to said pilot data so as to minimize a probability of error upper bound of a mismatch between said estimated channel state coefficient and perfect knowledge of said characteristic of the data channel;

allocating the remaining fraction of power to said modulated data matrix; and scaling by a respective scaling factor each of said plurality of data bearing coefficients and said plurality of pilot values in accordance with said power allocation.

8. The method for data communication as recited in claim 7 further including the steps of:

providing a first plurality of antennas to the transmitter, each defining one end of a corresponding data channel;

providing a second plurality of antennas to the receiver, each defining an opposite end of a corresponding data channel; and estimating in said channel state estimating step a channel state coefficient for all data channels defined by said first plurality of antennas and said second plurality of antennas.

9. The method for data communication as recited in claim 7 further including the step of selecting said data bearing coefficients and said pilot values such that when arranged to matrices consistent with modulation of and addition to said codeword by matrix operations, matrix multiplication of one of said matrices by the transpose of the other results in a null matrix.

10. The method for data communication as recited in claim 7, where said channel state estimating step includes the steps of:

estimating said channel state coefficient from said received pilot-embedded codeword by a first estimation and said predetermined data bearing coefficients; and updating said estimated channel state coefficient by a second estimation.

11. The method for data communication as recited in claim 10, where said channel state information estimating step includes the steps of:

providing as said first estimation a maximum-likelihood estimation of said channel state coefficient; and providing as said second estimation a linear minimum mean-square error estimation of said channel state coefficient given said maximum likelihood estimation of said channel state coefficient.

12. The method for data communication as recited in claim 7, where said block codeword forming step includes the step of forming a space-time block codeword as said block codeword.

13. The method for data communication as recited in claim 12 further including the step of forming a vector from matrix of said received pilot-embedded space-time codeword prior to said channel state information estimating step.

14. A pilot-embedded data transmission and channel estimation method for a Multiple-Input Multiple-Output (MIMO) communication system comprising:

a data encoder encoding data received at an input thereof into data matrix produced at an output thereof;

a pilot embedder coupled to said data encoder and adding pilot data to said data matrix to produce pilot-embedded data matrix at an output thereof;

a transmitter coupled to said pilot embedder at an input thereof and transmitting said pilot-embedded data matrix over a plurality of time slots such that said pilot data is transmitted in each of said time slots;

a receiver coupled to said transmitter via at least one data channel, said receiver receiving through said data channel said pilot-embedded data matrix as modified by a characteristic of said corresponding data channel;

a channel estimator coupled to said receiver and estimating from said pilot data added to each of said data matrix said characteristic of said corresponding data channel for each of said pilot-embedded matrix received;

a data detector coupled to said channel estimator and recovering said data matrix from said pilot-embedded matrix in accordance with said estimated characteristic to produce at an output thereof estimated data matrix; and a data decoder coupled to said data detector and decoding said estimated data matrix in a manner complementary to said data encoder to reproduce said data.

15. The data communication system as recited in claim 14, wherein said pilot embedder modulates said data matrix prior to adding said pilot data thereto.

16. The data communication system as recited in claim 15, wherein said pilot embedder allocates power between said data matrix and said pilot data in accordance with predetermined criteria prior to said modulation of said data matrix.

17. The data communication system as recited in claim 14, wherein said channel estimator performs a first estimation of said channel state and a second estimation of said channel state based on said first estimation.

18. The data communication system as recited in claim 14, wherein said data encoder is a space-time block encoder.

* * * * *